United States Patent [19]  [11] Patent Number: 5,940,487
Bunch et al.  [45] Date of Patent: Aug. 17, 1999

[54] PROGRAMMABLE CALL PROCESSING SYSTEM AND METHOD

[75] Inventors: James L. Bunch, Dallas; Ronald A. Iovine, Plano; Samuel O. Perry, III, Garland; Leo J. Putchinski, Plano; Walter C. Robertson, Jr., Richardson; Ronald L. Ward, Flower Mound, all of Tex.

[73] Assignee: Alcatel USA Sourcing, L.P., Plano, Tex.

[21] Appl. No.: 08/682,362

[22] Filed: Jul. 17, 1996

Related U.S. Application Data

[60] Provisional application No. 08/015,237, Apr. 10, 1996.

[51] Int. Cl.[6] .................................................. H04M 3/42
[52] U.S. Cl. ........................ 379/201; 379/113; 379/242
[58] Field of Search .................................. 379/201, 207, 379/219, 242, 243, 220, 211, 112, 114, 115, 116, 113; 395/739, 682, 670, 672, 680, 733

[56] References Cited

U.S. PATENT DOCUMENTS

| | | |
|---|---|---|
| 5,206,899 | 4/1993 | Gupta et al. . |
| 5,386,464 | 1/1995 | Pruitt .................................... 379/201 |
| 5,426,694 | 6/1995 | Hebert .................................... 379/242 |
| 5,450,480 | 9/1995 | Man et al. ............................ 379/201 |
| 5,452,341 | 9/1995 | Sattar .................................... 379/201 |
| 5,455,853 | 10/1995 | Cebulka et al. ...................... 379/201 |
| 5,463,682 | 10/1995 | Fisher et al. ......................... 379/201 |
| 5,469,500 | 11/1995 | Sattar et al. ......................... 379/201 |
| 5,471,526 | 11/1995 | Linnermark et al. ................. 379/268 |
| 5,473,680 | 12/1995 | Porter .................................... 379/201 |
| 5,475,746 | 12/1995 | Miller et al. ......................... 379/201 |
| 5,495,484 | 2/1996 | Self et al. ............................ 370/338 |
| 5,517,563 | 5/1996 | Norell .................................. 379/220 |
| 5,526,415 | 6/1996 | Wakamoto ............................ 379/220 |
| 5,537,467 | 7/1996 | Cheng et al. ........................ 379/211 |
| 5,546,453 | 8/1996 | Hebert .................................. 379/242 |
| 5,572,581 | 11/1996 | Sattar et al. ......................... 379/201 |
| 5,581,608 | 12/1996 | Jreij et al. ............................ 379/201 |
| 5,644,631 | 7/1997 | Sattar et al. ......................... 379/201 |
| 5,703,940 | 12/1997 | Sattar et al. ......................... 379/201 |
| 5,708,697 | 1/1998 | Fischer et al. ........................ 379/67 |
| 5,717,747 | 2/1998 | Boyle, III et al. .................... 379/201 |
| 5,734,708 | 3/1998 | Backstrom ............................ 379/243 |
| 5,740,236 | 4/1998 | Pruitt .................................... 379/201 |

FOREIGN PATENT DOCUMENTS

| | | | |
|---|---|---|---|
| 0505092 | 12/1992 | European Pat. Off. | ....... H04Q 3/545 |
| 9523482 | 8/1995 | WIPO | ............................ H04Q 3/00 |

OTHER PUBLICATIONS

PCT Written Opinion, dated Sep. 3, 1998.
PCT Search Report, dated Apr. 12, 1997.
Fujioka, et al., "Universal Service Creation and Provision Environment for Intelligent Network," IEEE (1991) Jan. No. 1.
Fritsche, Norbert, "Basic Call Processing Architecture for Flexible Control of Supplementary Services," ISS'95, Apr. 1995, vol. 2.
Uchiyama, et al., "An Environment for Supplementary Service Development," ISS'95, Apr. 1995, vol. 1.
Zolzettich, et al., "Customized Service Creation: A New Order for Telecommunication Services," IEEE Infocom (1992).
Bosco, et al., "A Laboratory for AIN Service Design and Validation," Supercomm/ICC (1992).
Ebert, et al., "Application of a Service–Independent Architecture," International Switching Symposium (1990).

*Primary Examiner*—Scott Wolinsky
*Attorney, Agent, or Firm*—Baker & Botts, L.L.P.

[57] ABSTRACT

A programmable call processing system (70) provides a standard call processing process (82) performing call processing according to industry standard call models, at least one database (84, 86) storing call processing data accessible by a set of call processing state machine process (80), and at least one customized call logic program (92) for implementing extended subscriber features on a telecommunications switching system. Further, an application program interface (94) provides access by the at least one customized call logic program (92) to the at least one call processing database (84, 86) and further interrupting the standard call processing process (82) to execute the customized call logic program (92).

48 Claims, 8 Drawing Sheets

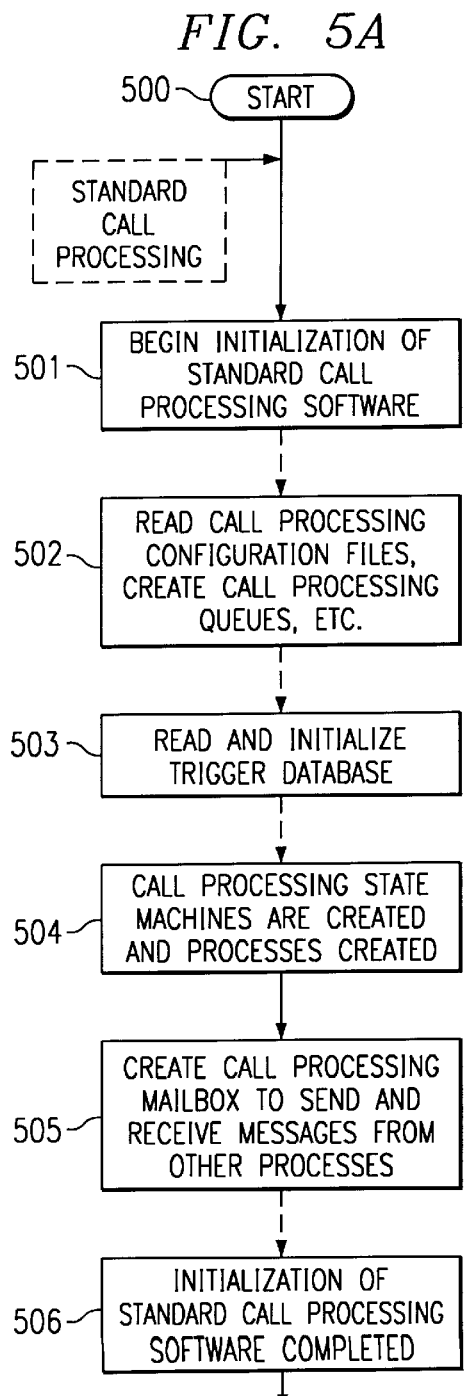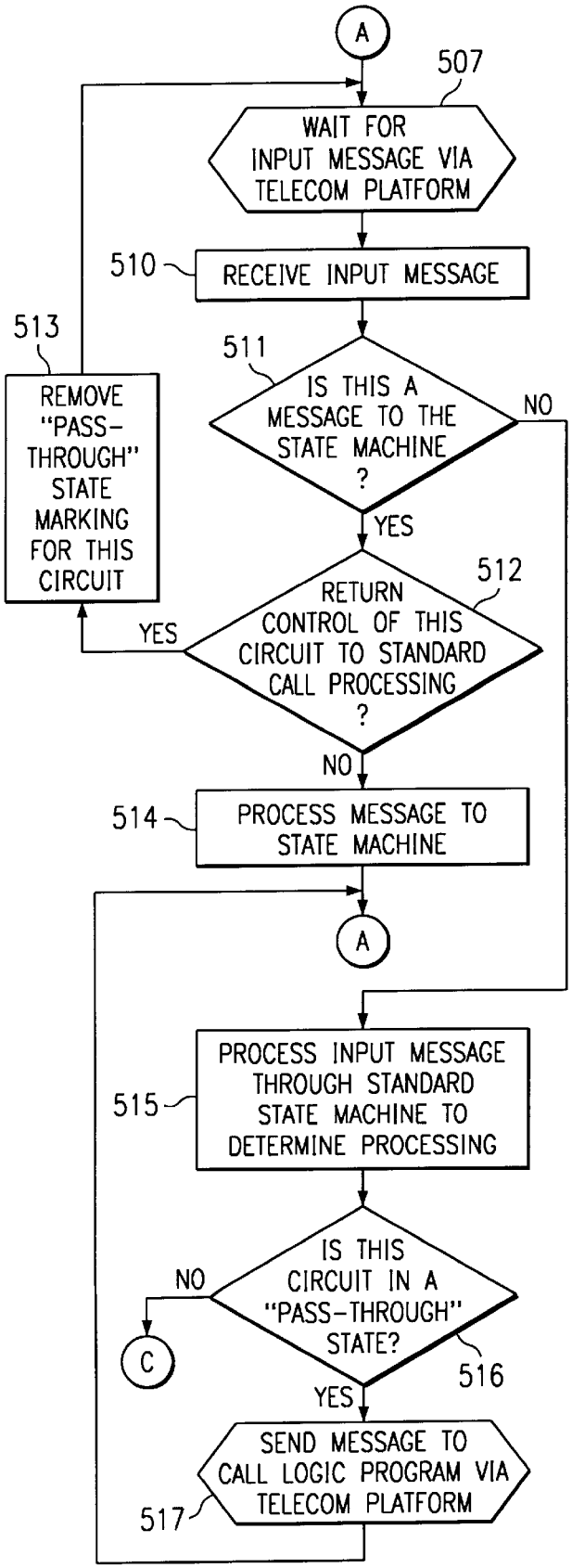

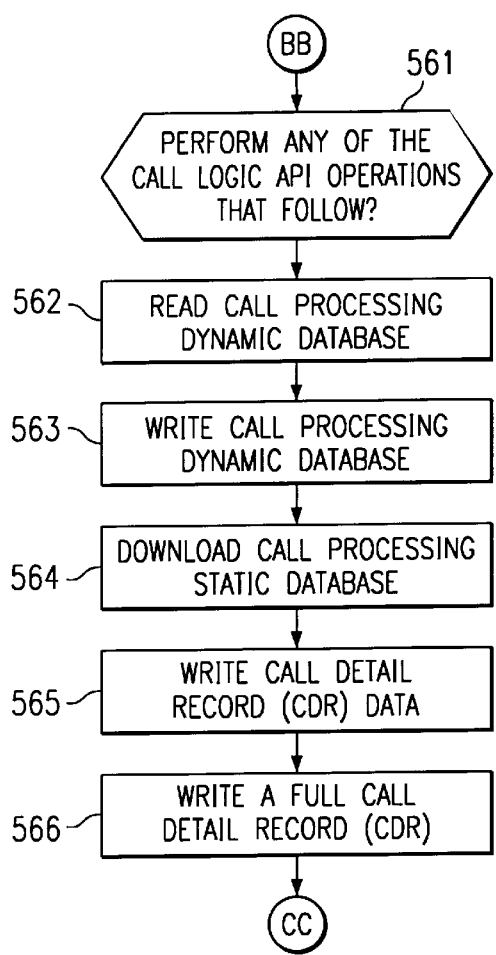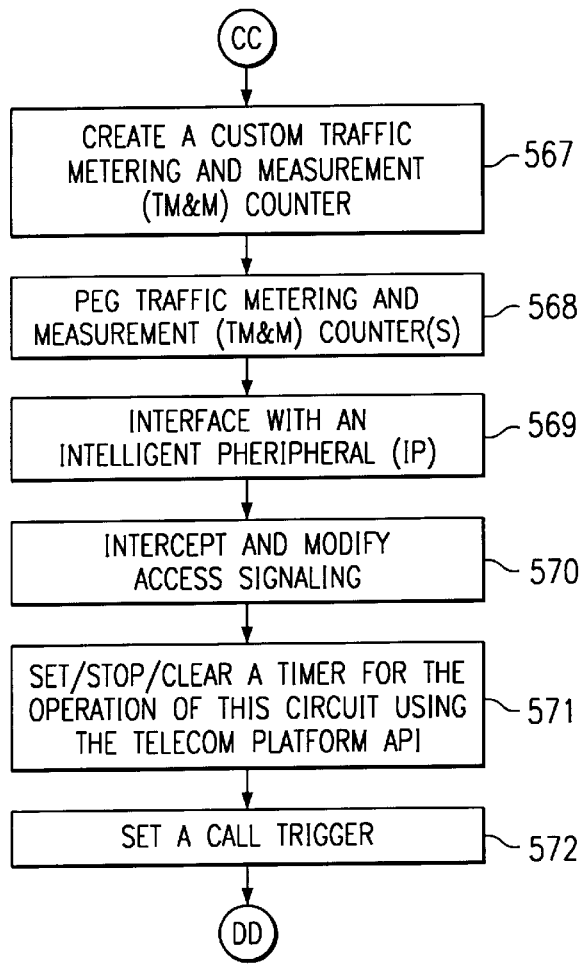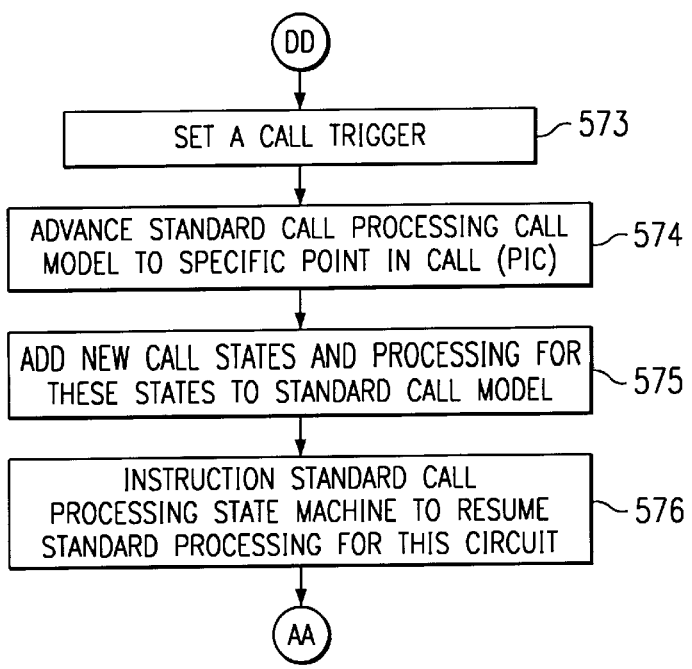

PROGRAMMABLE CALL PROCESSING SYSTEM AND METHOD

RELATED APPLICATIONS

The application claims the benefit of U.S. Provisional application Ser. No. 60/015,237, filed Apr. 10, 1996.

TECHNICAL FIELD OF THE INVENTION

This invention is related in general to the field of telecommunications. More particularly, the invention is related to a programmable call processing system and method therefor.

BACKGROUND OF THE INVENTION

Telecommunications service providers who purchase switching systems may often desire to make modifications or extensions to the purchased system. The extensions are generally subscriber features which may provide additional revenue to the service provider. For example, the service provider may wish to implement new call processing features, develop custom features for special end users, collect specific information about a particular call, and collect specific traffic metering and measurement (TM&M) data about certain call processing operations.

However, adding extensions to the switching systems has proven difficult in the past because the switching systems are large and complex. Generally, only the switching system manufacturer and vendor has the expertise to affect the changes desired. Therefore, there may be some lead time required to implement these changes.

SUMMARY OF THE INVENTION

From the foregoing, it may be appreciated that a need has arisen for a call processing system and method that facilitates the provision of customized and non-standard call processing logic without long lead time. It is also advantageous for the service providers to have the capability and know-how to develop and implement the expanded subscription services in house.

In accordance with the present invention, a programmable call processing system and method therefor are provided which substantially eliminates or reduces disadvantages and problems associated with conventional call processing systems and methods.

According to one aspect of the invention, a programmable call processing system provides a standard call processing process performing call processing according to industry standard call models, at least one database storing call processing data accessible by the set of standard call processing process, and at least one customized call logic program for implementing extended subscriber features on the telecommunications switching system. Further, an application program interface provides access by at least one customized call logic program to at least one call processing database and further interrupting the standard call processing processes to execute the customized call logic program.

According to another aspect of the invention, a method for programmable call processing for a telecommunication switching system is provided. The method includes the steps of providing at least one customized call logic program extending subscriber services provided by a standard call processing process, initializing the standard call processing process, and upon the occurrence of a specified event, transferring control from the standard call processing process to at least one customized call logic program.

BRIEF DESCRIPTION OF THE DRAWINGS

For a better understanding of the present invention, reference may be made to the accompanying drawings, in which:

FIGS. 5A–5H are simplified flowcharts of standard call processing, call logic program process flow, and interaction therebetween according to the teachings of the present invention;

DETAILED DESCRIPTION OF THE INVENTION

Figure 1:
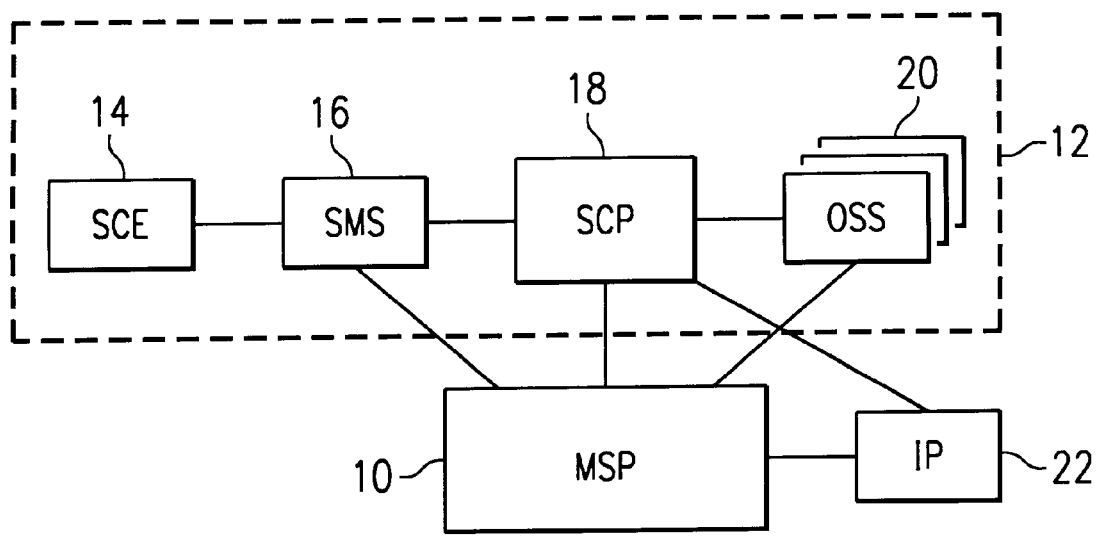
FIG. 1 is a simplified block diagram of an advanced intelligent network architecture.

The preferred embodiment(s) of the present invention is (are) illustrated in FIGS. 1–8, like reference numerals being used to refer to like and corresponding parts of the various drawings.

I. Distributed Telecommunications Switching System

The Programmable call processing system and method according to the teachings of the present invention provide a flexible interface which allows telecommunications service providers to implement and expand their own call processing features on a distributed telecommunications switching system 10 (Multi-Service Platform), shown in FIG. 1. Distributed Telecommunications switching system 10 is described in detail in U.S. Pat. No. 5,495,484 issued on Feb. 27, 1996 to Self et al., herein incorporated by reference. Distributed telecommunications switching system 10 is coupled to an advanced intelligent network (AIN) 12 as defined by the International Telecommunication Union (ITU), the American National Standards Institute (ANSI), and Bell Communications Research (Bellcore).

Distributed telecommunications switching system 10 interfaces with several advanced intelligent network elements: service creation environment (SCE) 14, service management system (SMS) 16, service control point (SCP) 18, and operational support systems (OSS) 20 via industry standard protocols such as X.25, SS7 or C7. Distributed telecommunications switching system 10 performs all of the switching system and call handling functions. It performs the service switching point (SSP) functions defined for advanced intelligent network 12.

An intelligent peripheral (IP) 22 is further coupled to distributed telecommunications switching system 10 and contains the functionality and resources needed to exchange information with an end user and elements of advanced intelligent network 12. Intelligent peripheral 22 may contain hardware that enables it to perform functions such as collect dialed digits from the user, play recorded announcements to the user, perform voice command recognition, and the like.

Operational support systems 20 is used by the telecommunication service provider to install, equip and manage its network. Distributed telecommunications switching system 10 interfaces with operational support systems 20 for the purposes of providing system 10 performance information and billing records used to generate end customer bills. System 10 also performs the configuration operations specified by operational support systems 20 in response to network management requests.

Service control point 18 is a transaction based processing system whose responsibility is to respond to queries from SSP calls requiring the use of advanced intelligent network service logic. Service control point 18 contains the service logic and data used to provide the advance intelligent network based services. Service creation environment 14 is used to create the programs that are executed in service control point 18.

Service management system 16 provides network information, database management, and administrative support for the network. It interfaces to service control point 18 for provisioning, database management, service control point application program management, and collecting Traffic Metering and Measurement (TM&M) data. Service management system 16 is primarily responsible for updating the database in service control point 18, synchronizing the databases among multiple service control points, and auditing the database.

The creation and delivery of service logic programs is the function of service creation environment 14. Service creation environment 14 produces service logic programs (SLP) which define the desired advance intelligent network service processing. These programs are downloaded to service control point 18 which executes the programs. The SLPs define the processing which occurs for a given service when an SSP determines that the call model detects a trigger event and sends a query message to an SCP for additional processing.

Distributed telecommunications switching system 10 is partitioned into two major areas, hardware and software, and briefly described below.

A. Hardware

Figure 2:
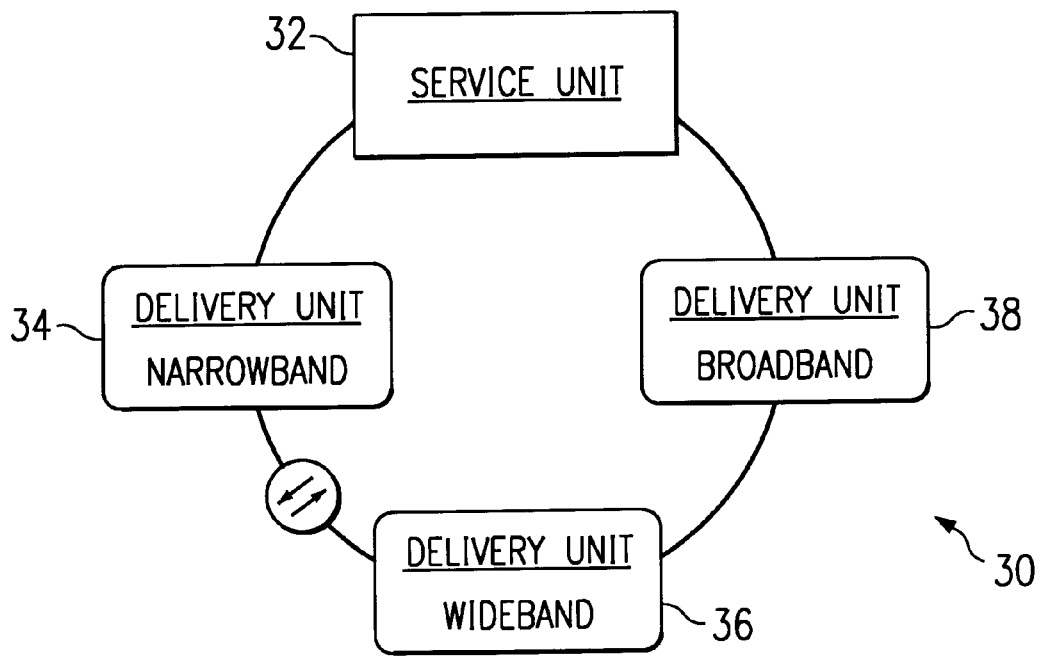
FIG. 2 is a simplified block diagram of a multi-services platform.

Referring to FIG. 2, distributed telecommunications switching system hardware 30 is divided into two subsystems, a service unit (SU) 32 and delivery units (DU) for narrowband 34, wideband 36, and broadband 38. Service unit 32 is a general purpose computing platform which optionally may be based on fault tolerant hardware. Further, service unit 32 may be implemented by single computing unit, or several computing units networked together. An implementation of service unit 32 utilizes a POSIX compliant operating system and provides a "UNIX-like" fault tolerant computing platform.

Service unit 32 provides advanced intelligent network call control functions. Programmable call processing system of the present invention may reside in service unit 32. The call logic programs developed by telecommunications service providers by using programmable call processing system of the present invention may also reside in service unit 32.

Delivery units 34–38 are application dependent devices generally providing the matrix fabric, facilities, interfaces, and resources for distributed telecommunications switching system 10. Delivery units 34–38 are responsible for the interface to the end user traffic sources. System 10 may support multiple delivery units 34–38 of the same or different types on the same platform. Narrowband delivery unit 34, wideband delivery unit 36, and broadband delivery unit 38 are examples of the types of delivery units which can be connected to a controlling service unit 32.

B. Software

1. Basic Architecture

The distributed telecommunication switching system software is similarly divided into two areas: the service unit software and the delivery unit software. The service unit software is related to programmable call processing system and method of the present invention and is thus described in more detail below. The service unit software is preferably implemented in object-oriented methodology and may be written in C++ or other suitable computer languages.

The service unit applications software preferably runs on a POSIX compliant operating system which provides a "UNIX-like" operating environment. The service unit application software programs execute as independent units called processes. These processes provide functions such as call control/call processing, service switching, and operations, administration and maintenance functions (OA&M). Of these, the call processing software is related to the programmable call processing system and method and is described briefly below.

The service unit call processing software may be implemented using "UNIX-LIKE" processes and is preferably based on the finite state machine concept. The standard call processing software provides several different state machines. These state machines can function as industry standard call models, such as the advanced intelligent network basic call model, or as customer-specific call models. The industry standard call models are built using the standard call processing state machines.

Figure 3:
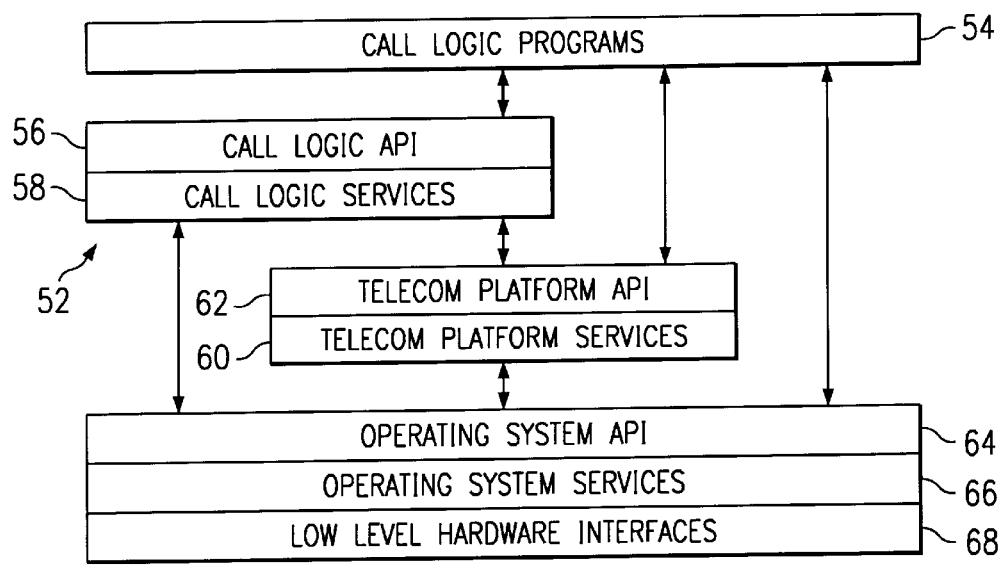
FIG. 3 is a simplified block diagram of a service unit software layered architecture according to the teachings of the present invention.

The internal software organization of the service unit is shown in FIG. 3. It may be seen that service unit software 50 is structured as a layered architecture. This layered architecture isolates the application software from the underlying platform functionality, as well as provide is well-defined interfaces which can be used by other application software. Service unit software 50 includes the components that make up programmable call processing system and method 52.

Referring to FIG. 3, call logic programs 54 are call processing applications that are either implemented by the switch manufacturer and provided to the telecommunications service providers or applications that are implemented by the service providers via a call logic application program interface (API) 56 constructed according to the present invention. Standard call processing applications such as wireless local loop (WLL), personal communications services (PCS), and tandem may be available from the switch manufacturer. The call logic programs implemented by the service providers with the aid of programmable call processing system 52 of the present invention may hereinafter be referred to as customer-developed call logic programs or applications.

The next layer, call logic services Layer 58 implements the functionality provided in call logic programs 54 via call logic application program interface 56. Call logic services layer 58 preferably provides the following exemplary operations and facilities:

Manipulate call instance data

Access call processing databases

Generate call detail record (CDR) data

Generate traffic metering and measurement (TM&M) data

Control access signaling

Control of an intelligent peripheral (IP)

Advanced intelligent network standard call model usage

Call model control

Access to call model point in call (PIC)

Programmable call model usage

Programmable common channel signaling interface

A set of services common to telephony products and applications has been identified and designated as telecom platform services 60. A telecom platform application program interface (API) 62 provides an interface to these services 60. Telecom platform application program interface 62 provides an easy to use programming interface for call logic programs 54. It also performs the error checking necessary to ensure that the underlying system is not corrupted by invalid software requests. Telecom platform application program interface 62 is also used by call logic services Layer 58 to isolate it from the implementation of the telecom platform functionality.

Telecom platform services layer 60 preferably provides the following exemplary functionality for use by call logic programs 54 and call logic services 58:

Event reporting and logging

Basic database access, reading/writing tables and table entries

Tracing services to capture debug information

Communications services including message transmission to/from the delivery unit(s), message transmission to/from external systems (i.e. SS7, C7 messages)

Interprocess communications between processes on the service unit

Wrappers for operating system timer services (i.e. start/stop/restart call logic program level timers).

Wrappers for operating system process services (i.e. start/stop software processes)

Wrappers for operating system thread services (i.e. start/stop/restart call logic program threads)

Wrappers for operating system synchronization services (i.e. mutexes and semaphores)

Configuration support for the configuration of System hardware and software processes Fault detection and isolation processing Alarm logging and posting Processor restart and initialization Distributed telecommunications switching system 10 is designed to have operating system independence and portability. This is accomplished by an operating system application program interface (API) layer 64. Operating system application program interface layer 64 ensures that call logic programs 54, call logic services 58, and telecom platform services 60 are not rigidly linked to capabilities provided by any particular operating system. Operating system application program interface Layer 64 may provide a POSIX compliant interface for use by the upper layers 54–60 of the software that reside in the service unit. Operating system application program interface layer 64 defines the interface to an operating system services layer 66. Operating system services layer 66 preferably provides the following exemplary functions and capabilities:

Basic timing and timer functionality

Resource management

POSIX Signals management

Files and file system management

Computer networking interfaces

Graphical user interface (GUI) and windowing system support

The lowest layer in the software hierarchy is a low level hardware interfaces layer 68. This software layer 68 is responsible for the interface to the disk, tape, and other hardware devices. It provides an application program interface for use by operating system services layer 66. Low level hardware interfaces layer 68 is also the interface that is used to communicate with the delivery unit(s).

2. Programmable Call Processing System

Figure 4:
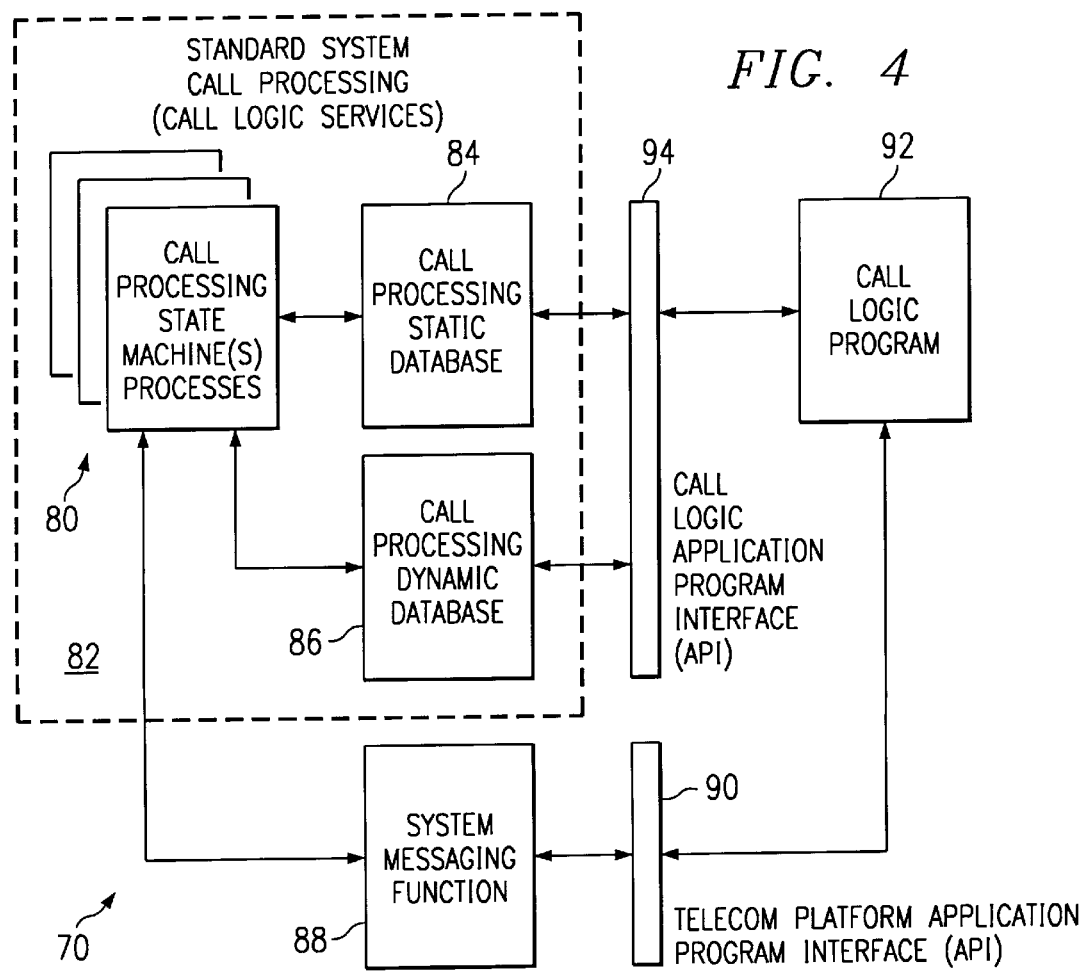
FIG. 4 is a simplified block diagram of certain call processing components according to the teachings of the present invention.

Referring to FIG. 4, a block diagram shows the call processing environment of programmable call processing system and method 70 in more detail. Recall that call processing is implemented in the form of state machine processes 80. State machine processes 80, as a part of standard system call processing processes 82, access a call processing static database 84 to obtain information about each of the hardware circuits in distributed telecommunications switching system 10 and the call processing database to complete telephone calls on these circuits. Each of the standard system call processing processes 82 also maintains a call processing transient database 86 about the state of each circuit which is designated as a call block. The call block includes transient data such as customer dialed digits, call routing data, etc.

Communications provided by system messaging function 88 is used by call processing state machine processes 80 to communicate between each call processing process, including customer-developed applications. It is also used to interface with the rest of the system to pass information (such as TM&M or billing data) for processing by the rest of the system software, such as telecom platform application program interface 90 (also shown in FIG. 3).

Customer-developed call logic programs 92 may communicate via messages provided by system messaging function 88 and shared memory to standard system call processing 82. Shared memory is preferably used by the programmable call processing system library functions to directly access the call processing databases 84 and 86. As shown in FIG. 4, programmable call processing system 70 also provides an application program interface 94 between call logic programs 92 developed by service providers and static and dynamic databases 84 and 86. Customer-developed applications 92 are preferably C++ programs or generated by a service creation environment (SCE) by using service independent blocks (SIBs). Customer-developed call logic programs 92 may be compiled using commercially available software tools to include application program interface files to interface with standard call processing 82 and databases 84 and 86.

Figure 5C:
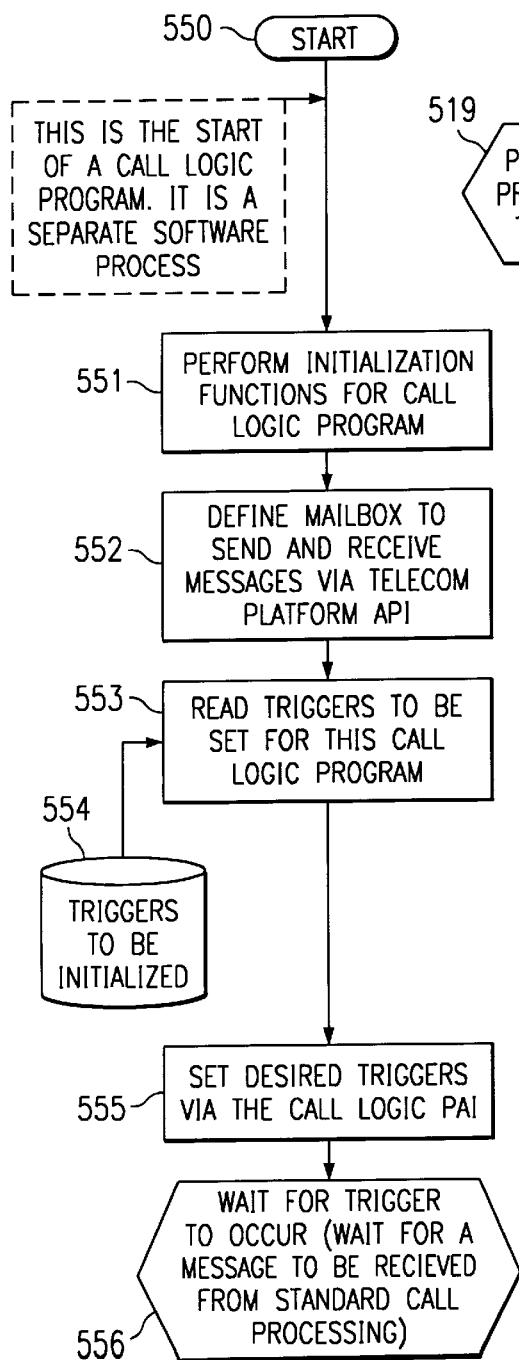

The overall exemplary operation of standard call processing 82 and programmable call processing system 70 is shown in FIGS. 5A–5H. Referring first to FIG. 5A, the standard call processing process begins in block 500. The initialization of the software begins in block 501 and continues with the reading of the configuration files and the initialization of the internal data structures in block 502. Trigger database structures are initialized in block 503 and any persistent entries are read from a predetermined file and inserted into the proper locations in the trigger database. Next, the software processes that form the state machine are created, as shown in block 504, via application program interface calls to the telecom platform. Mailboxes that are used to exchange messages are then created, as shown in block 505. Standard call processing initialization is completed in block 506 which is the indication to the system that the call logic programs may now be created and initialized. Proceeding to FIG. 5B, the standard call processing process then waits for a message to be received in its mailbox, as shown in block 507. This causes the operating system to suspend the standard call processing software while it waits for a message.

The call logic program processes initialization 550 perform initialization logic that is very similar to that performed by the standard call processing process(es), as shown in block 551. The call logic program initialization is given control by the operating system after the standard call processing processes have completed initialization and is suspended. In block 552, mailbox(es) are defined by call logic program 92 for the receipt of messages from other processes, including the standard call processing processes. This mailbox is also used to send messages to other processes.

Next, the desired triggers are read, as shown in block 553, from a trigger database 554. These triggers may be defined by a craft interface program or they may be created by a service creation environment program. Call logic program application program interface 94 is used to set the desired triggers in the standard call processing trigger database, as shown in block 555. The identity of the call logic program is part of the data passed to the application program interface used to establish the call trigger. The trigger database and its functions are described in more detail below.

Finally, call logic program process 92 executes a call to telecom platform application program interface 90 to wait for a message on the desired circuit trigger, as shown in block 556. The process is suspended while it waits for a message.

The receipt of a message in its mailbox causes the standard call processing process to resume execution, as shown in block 510 of FIG. 5B. In block 511, the received message is examined to determine if this is a message that is to be passed to call processing applications software, which includes the call logic program, or a message to change the control of the state machine for the circuit associated with the message. If the received message indicates that it is to be passed to the state machine, and control of this circuit is to return to standard call processing, as determined in block 512, the pass-through marking of the call processing state associated with this circuit is removed in block 513. As a result, all future messages associated with this circuit are subsequently processed by the standard call processing software.

If the message received does not pertain to the change in the operation of the processing for a specific circuit, as determined in block 512, then the message to the state machine will be processed, as shown in 514. The standard call processing software resumes its wait for another message to process and is suspended if no messages are waiting, as execution is shown returning to block 507.

Messages for specific circuits are processed, as shown in block 515, and are forwarded to the call logic program if the associated circuit is a pass-through state, as determined in block 516. The message received for the circuit controlled by a call logic program is placed in a message and sent to the call logic program via the telecom platform application program interface, as shown in block 517. The standard call processing software then resumes its wait for another message to process and is suspended if no messages are waiting for processing, as shown in block 507.

Figure 5D:
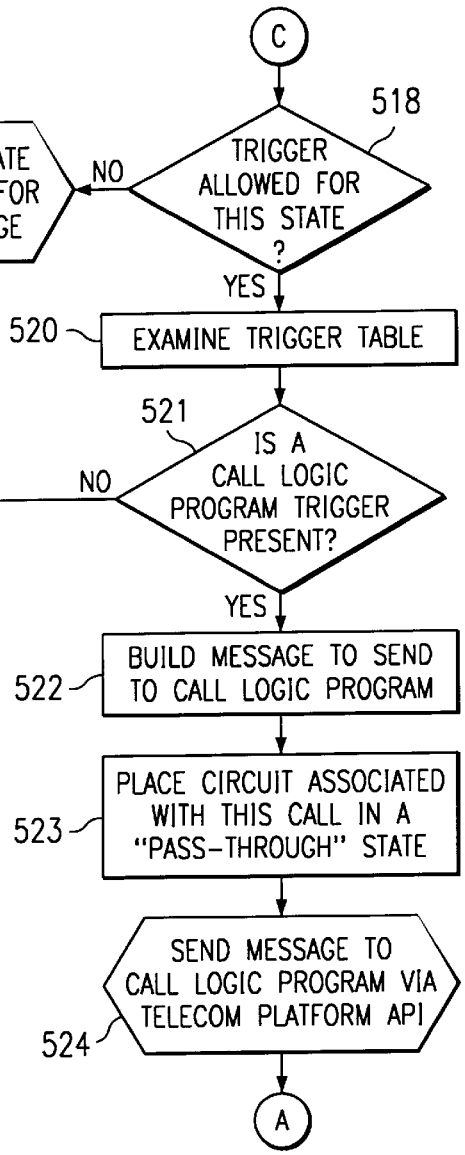

Proceeding to FIG. 5D, a test is made to determine if the current state of a circuit allows a trigger to be set for the circuit, as shown in block 518. If this state does not allow a trigger, the received message is processed by the standard call processing logic, as shown in block 519, which resumes its wait for another message to process and is suspended if no messages are waiting for processing in block 507.

In the case where a trigger is allowed, as determined in block 518, trigger database 554 is examined in block 520 and a determination is made as to the presence of a trigger for this circuit, as shown in block 521. If a trigger is not present, the received message is passed to the standard call processing software for processing, which waits for another message to process and is suspended if no messages are waiting for processing, as shown in block 507.

The detection of a valid trigger in block 521 results in the construction of a message to the call logic program for the "triggered" circuit using the message received by the standard call processing software, as shown in block 522. The state of the circuit is then marked as a "pass-through" state in block 523. This means that all future messages received by the standard call processing process for this circuit are forwarded to the call logic program. The call logic program may instruct standard call processing via a message to the state machine when it no longer wishes to receive messages for this circuit. The newly formatted message is then sent to the call logic program via the telecom platform application program interface, as shown in block 524. The standard call processing software then resumes its wait for another message to process and suspends if no messages are waiting for processing, as shown in block 507.

Figure 5E:
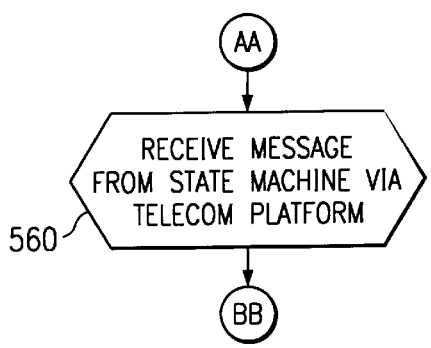

The call logic program process is suspended until it receives a message sent to it by another process, as shown in block 560 of FIG. 5E. The exact processing is dependent on the design and implementation of the call logic program. The desired operation to be performed is a combination of call logic program processing and the use of the call logic program application program interfaces. The call logic program performs and completes the desired application program interface functionality in block 561 and then returns to block 560 to wait for further messages. It is suspended if no messages are waiting to be processed.

Blocks 562–576 set forth exemplary call logic application program interface functionalities that may be performed in block 561. In block 562, call processing dynamic database 86 (FIG. 4) is read for a particular circuit. The data in dynamic database 86 is used by standard call processing to complete a call based on the standard call model of processing. An example of this type of data is the number dialed by a call originating on this circuit. Some of the dynamic data is exclusive to the standard call processing state machine software and may not be provided via call logic program application program interface 94.

In block 563, the call logic application program interface may be used to update dynamic database 86 associated with a particular circuit for a given call. However, the call logic application program interface is not allowed to alter all of the parameters in the dynamic data and all data supplied to the application program interface are validated before being applied. An example of the use of this functionality is to translate a called number into a different destination number, and write the new called number into the dynamic database for this circuit. Standard call processing is instructed to continue the routing of the call as if the new number had been dialed by the calling circuit.

The use of the call logic application program interface in block 564 enables the call logic program to retrieve call processing static database 84 associated with a given circuit or trunk group. This database typically contains the following type of information about the circuit or trunk group: circuit type, signaling type information, routing information, etc.

The call logic application program interface functionality in block 565 allows selective access to some of the fields in the standard call processing billing record or call detail record (CDR) so that they can be altered by the call logic program. The application program interface limits access to those fields which are defined as user-updatable, so that not all fields may be modified by the customer.

The ability to write a full call detail record (CDR) is provided, as shown in block 566, so that the call logic program can write a billing record to replace the record that ordinarily would be written by standard call processing. This facility enables the call logic program to create its own unique call detail records.

In block 567 is the capability to create one or more custom traffic metering and measurement (TM&M) counters. This functionality allows the call logic program to define traffic metering and measurement counters that are unique to the particular call logic program. These counters may then be collected and reported in the same manner provided for system standard counters.

The call logic program uses the functionality shown in block 568 to increment traffic metering and measurement counters. The counters may be either those provided by standard call processing or custom counters defined by the call logic program in block 567.

The call logic program may also be able to interface with an intelligent peripheral 22 (FIG. 1) via the functionality in block 569. The intelligent peripheral provides the ability to interface with an end user for the purposes of collecting digits, playing a recorded announcement, etc. This application program interface enables the call logic program to interface with the intelligent peripheral and make its services available to the call logic program.

The distributed telecommunications switching system has a number of programmable capabilities that are provided by the standard call processing software. The application program interface functionality shown in block 570 enables the call logic program to receive the messages destined for external systems before they are sent to those systems to transmit signaling information. The call logic program may alter these signaling messages or add custom fields to these messages prior to their transmission to the destination.

In block 571, an application program interface functionality enables the call logic program to use the timing facilities provided as part of the telecom platform. A timer may be set to send a software defined message to the call logic program. The ability to stop a timer which is running or delete a timer is also provided via this interface.

A call trigger may be set for a particular circuit by the call logic application program interface, as shown in block 572. This trigger causes the call logic program to be sent a message (and receive control) when the defined trigger condition is encountered by the standard call processing software state machine. The trigger mechanism is described in more detail below.

Similarly, a call trigger previously set by a call logic program may also be cleared by the call logic application program interface, as shown in block 573.

In block 574, application program interface may advance standard call processing call model to a specific point in call (PIC) to influence the operation of the standard call model provided by the standard call processing software. As a result, the call logic program may cause the standard call model to "skip" states or re-execute states as necessary. This functionality provides the call logic program with the ability to customize the operation of the standard call model.

Another application program interface functionality is to add new call states and processing for these states to the call model, as shown in block 575. The new states and processing will become an embedded part of the standard call model and do not require triggering out to the call logic program when this processing is invoked.

In block 576, an application program interface functionality may also instruct the standard call processing state machine to resume standard processing for a particular circuit. This capability enables the call logic program to gain control for several steps in the processing of a call and then return control to standard call processing for the remainder of the call or until another trigger for the call logic program is encountered.

Figure 6:
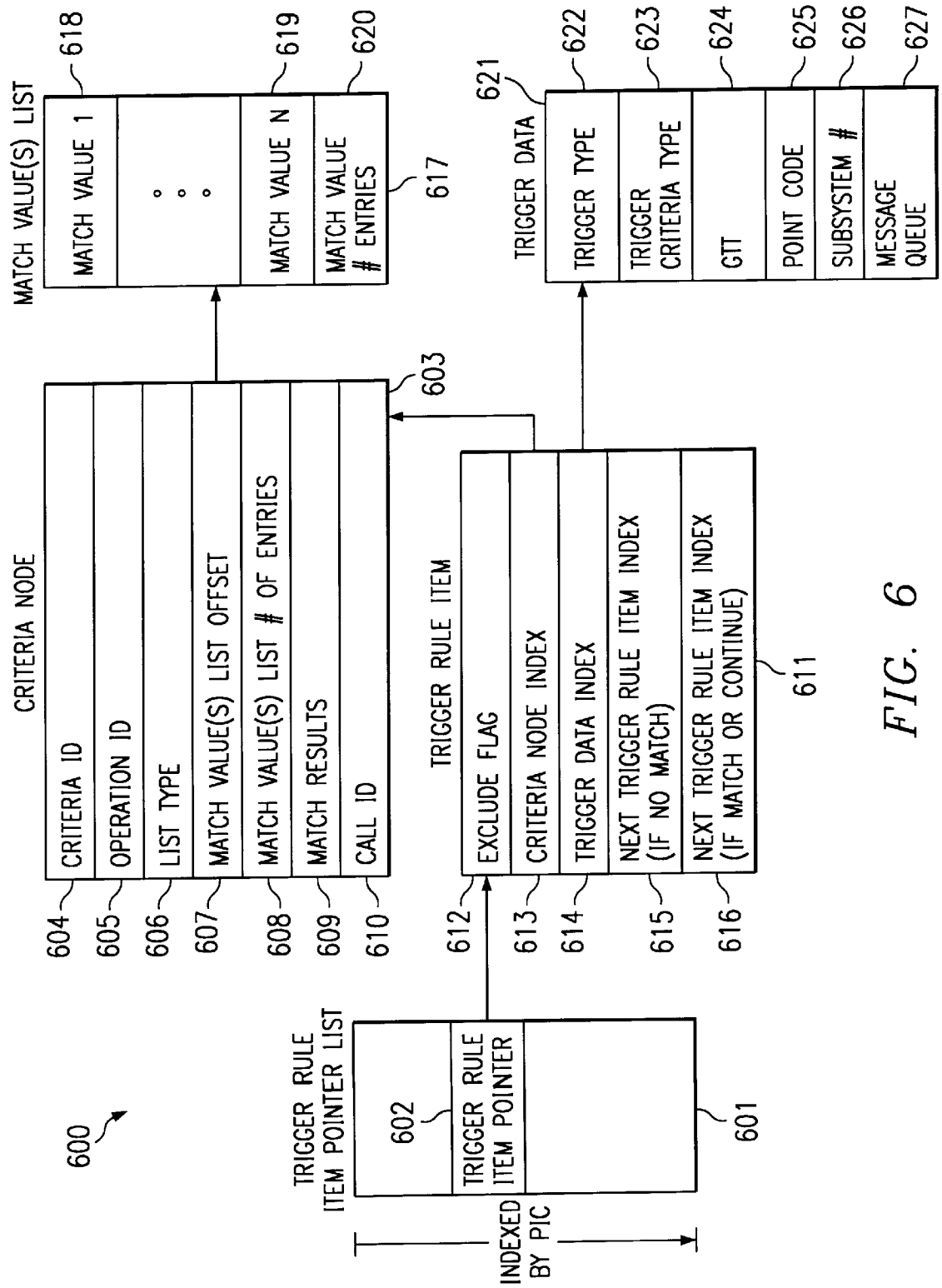
FIG. 6 is a simplified block diagram of an exemplary trigger database and components thereof according to the teachings of the present invention.

It may be seen from the foregoing that standard call processing is able to detect trigger conditions during standard call processing and launch query messages to a service control point application or pass call processing control to a customer-developed call logic program by using the call logic application program interface of the present invention. The triggering mechanism has been designed to adhere to industry standards for trigger processing but has been uniquely augmented to provide a mechanism for passing call processing control to a call logic program. FIG. 6 depicts the organization of a trigger database 600 and the relationship between components or structures within the database.

Referring to FIG. 6, trigger database 600 includes a trigger rule item pointer list 601, which is a list used to access a trigger rule item decision tree for a given point in call (PIC). List 601 is sized and indexed by the number of points in call. Trigger rule item pointer list 601 contains one trigger rule item pointer field 602, which is a pointer to the first trigger rule item 611 of the trigger rule item decision tree for a given point in call.

Trigger rule item 611 is a data structure having the individual criteria to be evaluated in the trigger rule item decision tree. It contains information used to determine how to perform the evaluation as well as what action to take based on the outcome of that evaluation. All of the triggers for a given point in call includes one or more trigger rule items. Each trigger rule item 611 contains an exclude flag 612, a criteria node index 613, a trigger data index 614, and two next trigger rule item index fields 615 and 616. The trigger rule items traversed by trigger processing are, in effect, the nodes in the trigger rule item decision tree.

Exclude flag field 612 contains a value that indicates whether or not to stop traversing the decision tree if a match condition evaluates to TRUE. The match condition is determined by evaluating information contained in a criteria node 603 as described in detail below. If this flag is TRUE and the match condition evaluates to TRUE, the traversal of the decision tree will stop at that point without triggering. Exclude flag field 612 allows the programmer to insert a "short circuit" condition at any point in the decision tree in order to prevent unnecessary traversals.

Criteria node index field 613 is an index to criteria node data 603 for a given trigger rule item. Trigger data index field 614 is an index to trigger data 621 for the given trigger rule item. Next trigger rule item index 615 is an index to the next trigger rule item if a MATCH condition is encountered or a CONTINUE response from a service control point query message is received. However, if a NO MATCH condition is encountered, another next trigger rule item index field 616 is referred to for the next trigger rule item.

As discussed briefly above, criteria node 603 contains information used to determine the type of information to check for a match, the type of comparison to perform, the data to check against, the results of the match, and the particular call the match was performed on. Each criteria node structure 603 contains multiple fields that are described below.

Criteria node 603 includes a criteria ID field 604. This field specifies the type of data contained in a match value(s) list 617. The types of data are either numeric values or digit strings. Criteria ID filed is also used by the application to determine where to get the source data to compare against the match values list entries. Criteria node 603 further includes an operation ID field 605. Operation ID field 605 specifies the type of operation to perform in order to indicate a match condition. It supports the basic logical operators, such as =, ≠, <, >, ≦, ≧, etc. The operations are performed against the data contained in match value(s) list 617 which may be a number, a list of numbers, or a range specified by two numbers. Criteria ID 604 described above is used to determine what databases and elements are compared against the match value(s) list entries.

Criteria node 603 further includes a list type field 606, which specifies whether the data in match value(s) list 617 is treated as a list of values or a range of values. If the data is to be treated as a list, the whole list is scanned for a match. If the list type is a range, it contains two values representing an upper and lower value inclusively.

A match value list offset field 607 is further provided in criteria node 603. This field is the offset in bytes from the beginning of the match values list 617 to the obtain the match value(s) 618, 619 for the current criteria node. Criteria node 603 further includes a match value array number of entries field 608, which contains the number of entries in match values in list 617 for the current criteria node.

A match results field 609 in criteria node 603 further contains the results of the match comparison for a given call traversal. It is either true, false, or not evaluated. This field ensures that, for a given call and a given decision tree, an evaluation is only done once in the traversal. A call ID field 610 is also included in criteria node 603 to identify the particular call a given match was performed on.

Another structure in trigger database is match value(s) list 617, which contains a list of values 618, 619, such as a numeric value or digit string, that can be searched for a match comparison on a trigger condition. A special case list is one that represents a range of values. For the range comparison, list 617 is limited to two values that represent the upper and lower limits of the range. In addition, each match value(s) list 617 contains a match value number of entries field 620, which provides a count of the number of match values in list 617.

Trigger data 621 is another component within trigger database 600. This data structure contains information used to build and route query messages to the service control point or a call logic program. Each trigger data structure 621 contains the following fields.

Trigger type field 622 is the industry standard trigger that this particular trigger data 621 is mapped to. The value in trigger type field 622 determines the type of query message to send to the service control point application. Trigger data structure 621 further includes a trigger criteria type field 623. This field contains the trigger data that is included in the message sent to the service control point as defined by industry standards.

Trigger data structure 621 also includes a global title translation (GTT) field 624. This field indicates that a service control point query is required using signaling system number 7 (SS7) global title translation. The global title translation value determines if the called number or the caller number is to be used for global title translation routing. This field is NULL if a service control point query using global title translation routing is not required.

A point code field 625 in trigger data 621 contains a value to indicate that a service control point query is required using SS7 point code and subsystem number routing. The value is the SS7 point code of the service control point that must process the query message resulting from this trigger condition. This field is NULL if a service control point query using point code and subsystem number routing is not required.

Another field, subsystem number 626, is the SS7 subsystem number of the application at the service control point that must process the query message resulting from this trigger condition. The subsystem number is valid only when a point code is specified. This field is NULL if a service control point query using point code and subsystem number routing is not required.

Trigger data 621 also includes a message queue 627 which contains the name of the message queue to use for transmittal of the query message to the appropriate service control point application or call logic program.

Figure 7A:
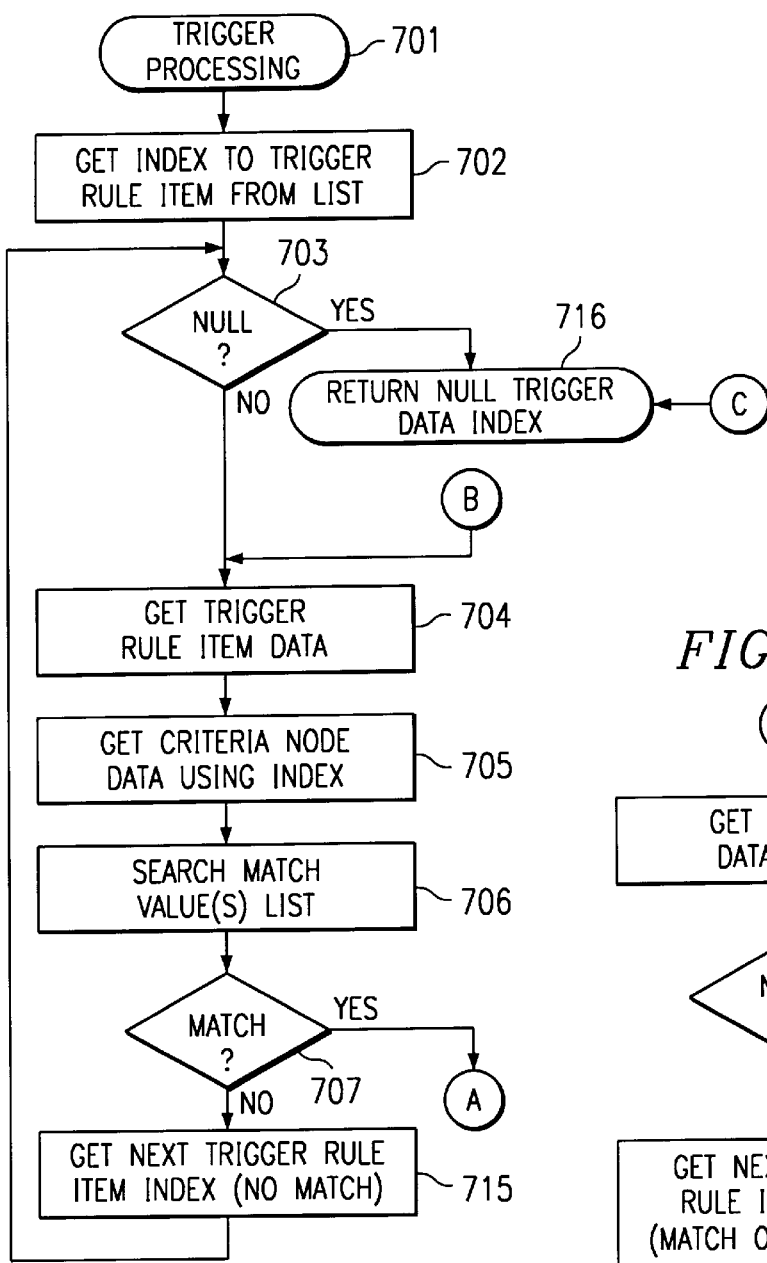
FIGS. 7A and 7B are simplified flowcharts of an exemplary trigger processing process flow according to the teachings of the present invention.
Figure 7B:
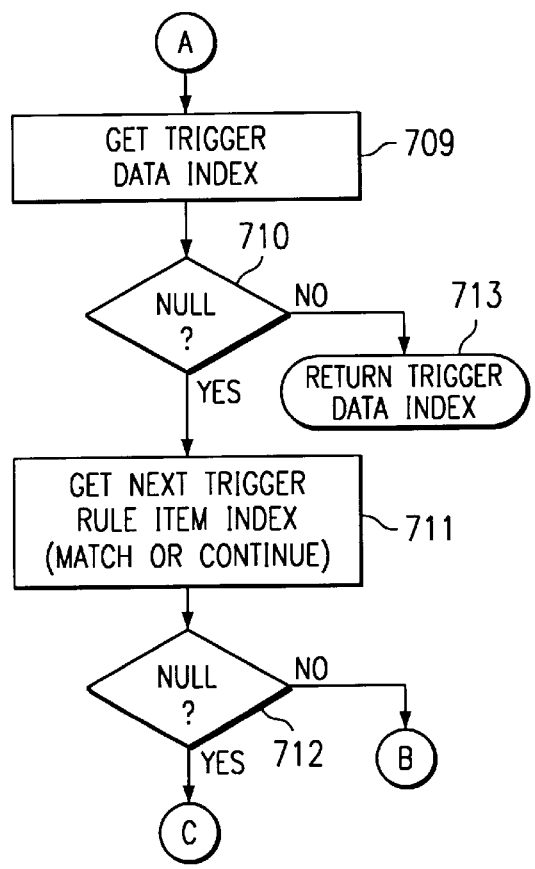

FIGS. 7A and 7B are flowcharts illustrating an exemplary trigger processing process. The standard call processing checks for trigger conditions at various points in call. This is accomplished by calling trigger processing 701 and passing the point in call as a parameter. Referring also to FIG. 6 for the trigger database structure, trigger processing 701 uses the point in call to index into trigger rule item pointer list 601 to access trigger rule item pointer 602 which locates trigger rule item 611, as shown in block 702. If trigger rule item pointer 602 is NULL, as determined in block 703, trigger processing returns a NULL trigger data index, as shown in block 716, to indicate that a trigger condition was not detected.

If trigger rule item pointer 602 is not NULL, criteria node 603 is accessed by using criteria node index 613 located by trigger rule item pointer 602 in trigger rule item 611, as shown in blocks 704 and 705. As described above, criteria node 603 defines the type of data in match value(S) list 617, what operations are valid for this data, and contains a pointer to match value(s) list 617. Criteria node 603 contains match value list offset 607 to locate the match value(s) for the present criteria node, and searched for a matching trigger value, as shown in block 706. An indication is returned in block 707 whether a match or no match condition was detected.

If the criteria node processing indicates a no match condition exists then the next trigger rule item index (no match) 615 is accessed at block 715. If this item is NULL, as determined in block 703, then a NULL trigger data index is returned in block 716 indicating that a trigger condition was not detected. Otherwise criteria node processing is repeated for the next trigger rule item referenced by field 615.

If criteria node processing indicates a match condition in block 707, then the trigger data index is accessed, as shown in block 709. If the trigger data index is a NULL value, as determined in block 710, then trigger processing accesses the next trigger rule item index (match or continue) field 616, as shown in block 711. If field 616 is NULL, as determined in block 712, then a NULL trigger data index is returned in block 716 to indicate that a trigger condition was not detected. If it is determined in block 710 that the trigger data index is not a NULL value, then it is returned in block 713 to the standard call processing to indicate that a matching trigger condition has been detected.

If in block 716 a NULL trigger data index is returned to standard call processing, then standard call processing resumes call processing at the current point in call. On the other hand, if trigger processing indicates a matching condition and returns a trigger data index other than NULL in block 713, then standard call processing uses the trigger data referenced by the returned trigger data index to build and transmit the query message to the service control point application or call logic program. The trigger type field 622 in trigger data 621 defines the type of query message to build, and the trigger criteria type field 623 is an industry-defined parameter that is included in the resulting query message. If the query message is to be directed to a service control point application, then the global title translation flag in field 624 or point code and subsystem number fields 625 and 626 have non-NULL values. If the query message is to be directed to a call logic program, then the global title translation, the point code and subsystem number fields have a NULL value. Standard call processing then uses message queue field 627 to queue the built query message to either the service control point application or the call logic program.

In operation, a telephone service provider may implement its own customized call logic programs by using the functionalities provided in the call logic application program interface according to the programmable call processing system and method therefor. Programmable call processing system and method therefor 52 constructed according to the teachings of the present invention are designed primarily to support subscriber features. An example of a feature that can be supported is an enhanced translation capability. Those features which require changes to the underlying system cannot be developed by the telecommunications service providers. For example, the addition of a new signaling protocol to the system cannot be implemented through programmable call processing system 52.

The customer-developed call logic applications are separate processes from the standard switch software processes. These applications are developed as C++ programs or generated using a services creation environment tool. Thereafter they may be compiled using commercially available software tools and use a software library resident on system 10. These customer-developed call logic applications run as separate POSIX/"UNIX-like" processes and are subject to all of the limitations imposed by this operating system. The customer-developed program has access to the call processing elements and the system database and messaging facilities. Programmable call processing system 52 provides screening of the interface between the customer-developed call logic programs and the standard call processing functions. Programmable call processing system further ensures that all of the data passed to the embedded system functions is valid, and rejects those that do not pass checks and inspections.

Figure 8:
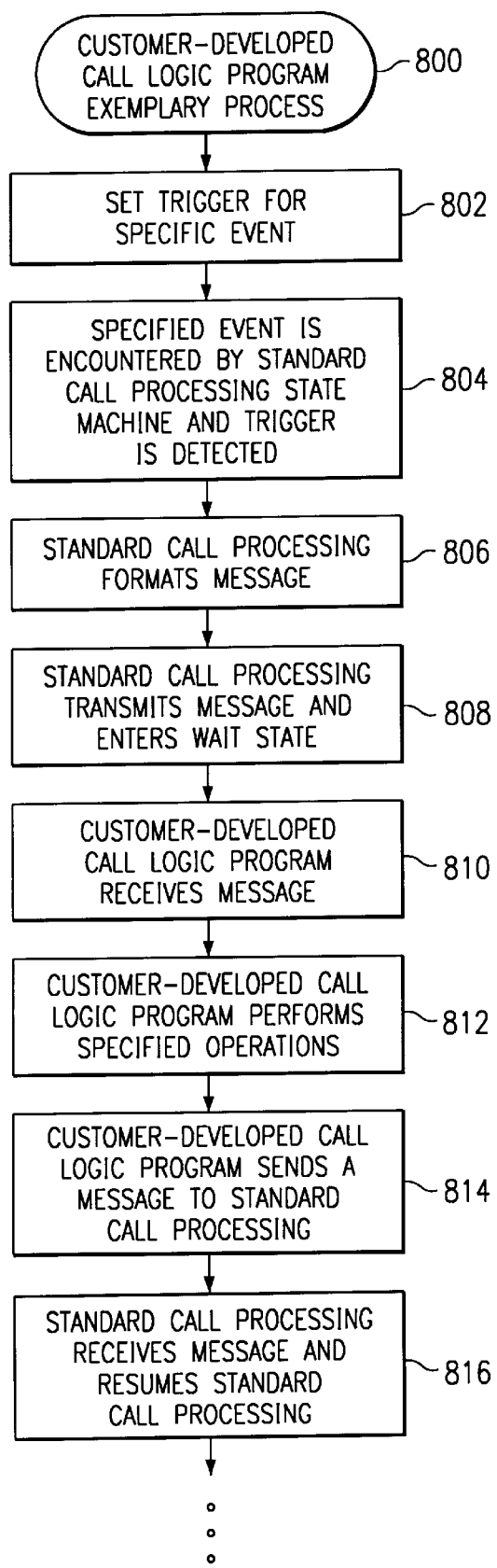
FIG. 8 is a simplified flowchart of an exemplary call processing process flow involving a customer-developed call logic program.

It may be instructive to examine how a customer-developed call logic program may be implemented to provide an enhanced translation capability, for example. The exemplary process flow is shown in FIG. 8. Referring to FIG. 8, the process flow for carrying out a customer-developed call logic program begins in block 800. In block 802, the customer-developed call logic program uses the call logic application program interface to set a trigger for a specific event, such as the receipt of an SS7 initial address message (IAM) on a particular trunk circuit. Thereafter, when the specified event is encountered, as shown in block 804, such as when the IAM message is received by the standard call processing state machine, the standard call processing process hits the trigger, which indicates that the event is to be processed by a customer-developed call logic program. Standard call processing process then formats an appropriate message, transmits the message to the customer-developed call logic program, and places the circuit into a "wait" state, as shown in blocks 806 and 808.

In block 810, the customer-developed call logic program receives the message sent by standard call processing, and performs appropriate operations, such as accessing its translation database to determine how to route the call and placing the routing data in the call block associated with the circuit, as shown in block 812. When the customer-developed call logic program completes its operations, it sends a message back to the standard call processing Process notifying it to continue processing and route the call, as shown in block 814. The standard call processing process, upon receipt of the message, continues the call and resumes the standard processing at the point it was interrupted or at a different point as directed by the customer-developed call logic program, as shown in block 816. Standard call processing may subsequently encounter one or more additional triggers which cause it to pass control to customer-developed call logic programs.

In this manner, programmable call processing system and method provide an integrated programmable call processing architecture on a general purpose computing platform, which is an integral part of a public switching system. Programmable call processing system and method provide a way for service providers to control switch functionality relative to service features and operations support data in a way not easily duplicated with intelligent network technology.

An advantage of the architecture presented is that it allows a standards based call model to be easily extended to provide custom call processing features. These features can be made available to end customers before the industry standards are updated. The architecture also allows the support of industry standard operating in parallel with the custom operation.

The call logic program management capability in its switching product ensures that:

Overall system reliability is not compromised with service provider programming. This is accomplished with call logic program execution monitoring, POSIX/ "UNIX-like" process management, and controlled access to general operating system capabilities though supported application program interfaces.

Controlled installation, testing, activation, deactivation, and versioning of call logic programs.

Call logic program resource control.

Call logic program performance statistics are obtainable.

The call logic program applications program interface offers both standards based specific and programmable functional operations on the native call processing software. These functional operations allow:

Specialized traffic metering and measurement collection counters to be associated with native call processing functions. After association, these counters may be automatically incremented by native call processing functions, and subsequently read by call logic programs for further processing.

Native call processing call detail records associated with per call billing data collection may be accessed from call logic programs. The call logic application program interface provides methods for selected field modifications as well as variable length fields to be added to the call detail record as service provided proprietary fields.

Call control network signaling protocols used in various message oriented access arrangements related to SS7 ISUP and ISDN Primary Rate are visible to call logic programs. Call logic programs may add, modify, or delete standard, optional and service provider proprietary parameters at selected points in incoming and outgoing call processing actions. These call logic program actions provide both transparent pass-through and native call processing affected behavior.

Relating to the intelligent network call model concept described in various industry standards documents from Bellcore and the ITU, a number of enhanced operations are available to the call logic program through the application program interface.

Arm/Disarm a trigger/event detection point in a currently executing call model.

Insert in priority order or remove a trigger filtering rule at a trigger detection point.

Control the visibility of various static and dynamic data elements to be presented to the call Logic Program at its activation, based on the satisfaction of trigger processing criteria.

Associate a new point in call (with subordinate trigger and event detection point, trigger types, and trigger criteria) with an entry point in the native basic call processing software.

Interact with a feature interaction management software within the native call processing architecture to accomplish customized service interaction control.

Interact with the service switching function of the native call processing architecture to modify interaction rules associated with external intelligent network systems. These interactions may affect intelligent network message formatting, network system routing and multicasting.

Invocation of file system operations related to information logging and retrieval from disk.

Invocation of management operations relative to network management data communications links at the record and file transfer levels.

What is claimed is:

1. A programmable call processing system for a telecommunications switching system, comprising:

a call processing processor having a standard call processing process to perform call processing according to industry standard call models;

at least one database storing call processing data accessible by said standard call processing process;

a call logic program processor having at least one customized call logic program to implement extended subscriber features on the telecommunications switching system;

an application program interface providing access by said at least one customized call logic program to said at least one call processing database and further interrupting said standard call processing process for execution of said at least one customized call logic program; and a system messaging function unit operable to provide communications between said at least one customized call logic program and said standard call processing process for passing information therebetween, wherein said customized call logic program is allowed to alter selected fields of call detail records formulated by said standard call processing process.

2. The programmable call processing system, as set forth in claim 1, wherein said standard call processing process includes at least one trigger inserted by said application program interface for transferring control to a customized call logic program upon the occurrence of a specified event.

3. The programmable call processing system, as set forth in claim 1, further comprising a trigger database storing one or more trigger definitions for interrupting said standard call processing process and passing control to said at least one customized call logic program.

4. The programmable call processing system, as set forth in claim 1, wherein said at least one customized call logic program is a separate process from said standard call processing process and running on said switching system in parallel with said standard call processing process.

5. The programmable call processing system, as set forth in claim 1, wherein said at least one call processing database includes a static database storing circuit configurations of said switching system.

6. The programmable call processing system, as set forth in claim 1, further comprising a messaging function for transmitting messages between said standard call processing process and said customized call logic program.

7. The programmable call processing system, as set forth in claim 1, wherein said at least one call processing database includes a dynamic database storing call data blocks.

8. The programmable call processing system, as set forth in claim 1, wherein said application program interface comprises an interface library for inclusion and use by said customized call logic programs.

9. A programmable call processing system for a telecommunications switching system, comprising:

a call processing processor having a standard call processing process to perform call processing according to industry standard call models;

at least one database storing call processing data accessible by said standard call processing process;

a call logic program processor having at least one customized call logic program to implement extended subscriber features on the telecommunications switching system;

an application program interface providing access by said at least one customized call logic program to said at least one call processing database and further interrupting said standard call processing process for execution of said at least one customized call logic program;

a trigger database storing one or more trigger definitions for interrupting said standard call processing process and passing control to said at least one customized call logic program, wherein said trigger database includes:

a trigger rule item point list indexable by a point in call at which a triggering event occurred; and at least one trigger rule table referenced by said trigger rule item point list and having triggering criteria and trigger data stored therein for passing control to said at least one customized call logic program.

10. The programmable call processing system, as set forth in claim 9, wherein said at least one trigger rule table includes:

a trigger rule item table having a plurality of trigger rule items for evaluating the triggering event;

a criteria node table having data used to evaluate the triggering event; and a trigger data table having data used to assemble a message to said at least one customized call logic program for passing control thereto.

11. The programmable call processing system, as set forth in claim 10, wherein said at least one trigger rule table further includes a match value table having values used in said triggering event evaluations.

12. A programmable call processing system for a telecommunications switching system, comprising:
   a call processing processor having a standard call processing process to perform call processing according to industry standard call models;
   at least one database storing call processing data accessible by said standard call processing process;
   a call logic program processor having at least one customized call logic program to implement extended subscriber features on the telecommunications switching system;
   an application program interface providing access by said at least one customized call logic program to said at least one call processing database and further interrupting said standard call processing process for execution of said at least one customized call logic program;
   a trigger database storing one or more trigger definitions for interrupting said standard call processing process and passing control to said at least one customized call logic program, wherein said trigger database includes:
      a trigger rule item point list indexable by a point in call at which a triggering event occurred; and
      a trigger rule item decision tree having at least one node referenced by said trigger rule item point list, each node having triggering criteria and trigger data stored therein for passing control to said at least one customized call logic program.

13. A programmable call processing system for a telecommunications switching system, comprising:
   a call processing processor having a standard call processing process to perform call processing according to industry standard call models;
   at least one database storing call processing data accessible by said standard call processing process;
   a call logic program processor having at least one customized call logic program to implement extended subscriber features on the telecommunications switching system;
   an application program interface providing access by said at least one customized call logic program to said at least one call processing database and further interrupting said standard call processing process for execution of said at least one customized call logic program, wherein said standard call processing process is implemented as a set of finite state machines and said at least one customized call logic program is implemented as a sub-state machine embedded within said standard call processing state machines.

14. A method for programmable call processing for a telecommunication switching system, comprising the steps of:
   providing at least one customized call logic program extending subscriber services provided by a standard call processing process;
   initializing said standard call processing process;
   upon the occurrence of a specified event, transferring control from said standard call processing process to said at least one customized call logic program;
   providing a communication link between said at least one customized call logic program and said standard call processing process for passing information therebetween; and
   allowing said customized call logic program to alter selected fields of call detail records formulated by said standard call processing process.

15. The method, as set forth in claim 14, further comprising the steps of:
   inserting a trigger for a triggering event in said standard call processing process for interrupting its execution; and
   analyzing said triggering event upon triggering.

16. The method, as set forth in claim 15, wherein said trigger event analyzing step comprises the steps of consulting a trigger database for evaluation criteria and values.

17. The method, as set forth in claim 15, further comprising the step of removing a trigger from said standard call processing process.

18. The method, as set forth in claim 14, further comprising the step of allowing said at least one customized call logic program to access a call processing database.

19. The method, as set forth in claim 14, further comprising the steps of:
   allowing said at least one customized call logic program to access a static call processing database having circuit configurations of said switching system; and
   allowing said at least one customized call logic program to access a static call processing database having call data blocks.

20. The method, as set forth in claim 14, further comprising the steps of transferring back control from said at least one customized call logic program to said standard call processing process at said specified event after the completion of customized call processing.

21. The method, as set forth in claim 14, further comprising the steps of transferring back control from said at least one customized call logic program to said standard call processing process at a specified point in call after the completion of customized call processing.

22. The method, as set forth in claim 14, further comprising the step of providing an application program interface between said standard call processing process and said at least one customized call logic program for passing control therebetween.

23. The method, as set forth in claim 14, further comprising the step of allowing said at least one customized call logic program to write a call data block to a static call processing database storing a plurality of call data blocks.

24. The method, as set forth in claim 14, further comprising the steps of embedding in said standard call processing process said at least one customized call logic program.

25. The method, as set forth in claim 14, further comprising the steps of:
   modeling said standard call processing process as a set of finite state machines; and
   modeling said customized call logic program as a sub-state machine embedded in said standard call processing process state machines.

26. The method, as set forth in claim 14, further comprising the steps of:
   modeling said standard call processing process as a set of finite state machines; and
   adding at least one sub-state machine to said standard call processing process state machines.

27. A method for programmable call processing for a telecommunication switching system, comprising the steps of:
   providing at least one customized call logic program extending subscriber services provided by a standard call processing process;
   initializing said standard call processing process;

upon the occurrence of a specified event, transferring control from said standard call processing process to said at least one customized call logic program;

inserting a trigger for a triggering event in said standard call processing process for interrupting its execution;

analyzing said triggering event upon triggering, wherein said trigger event analyzing step comprises the steps of:
consulting a trigger rule item table having a plurality of trigger rule items for evaluating the triggering event;
consulting a criteria node table having data used to evaluate the triggering event; and
consulting a trigger data table having data used to assemble a message to said at least one customized call logic program for passing control thereto.

28. The method, as set forth in claim 27, wherein said trigger data table consulting step includes the step of consulting a match value table having values used in said triggering event evaluations.

29. A method for programmable call processing for a telecommunication switching system, comprising the steps of:
providing at least one customized call logic program extending subscriber services provided by a standard call processing process;
initializing said standard call processing process;
upon the occurrence of a specified event, transferring control from said standard call processing process to said at least one customized call logic program;
inserting a trigger for a triggering event in said standard call processing process for interrupting its execution;
analyzing said triggering event upon triggering, wherein said trigger event analyzing step comprises the steps of:
consulting a trigger rule item point list indexable by a point in call at which a triggering event occurred; and
consulting a trigger rule item decision tree having at least one node referenced by said trigger rule item point list, each node having triggering criteria and trigger data stored therein for passing control to said at least one customized call logic program.

30. A method for programmable call processing for a telecommunication switching system, comprising the steps of:
providing at least one customized call logic program extending subscriber services provided by a standard call processing process;
initializing said standard call processing process;
upon the occurrence of a specified event, transferring control from said standard call processing process to said at least one customized call logic program;
generating call detail records by said standard call processing process; and
allowing said customized call logic program to formulate call detail records to replace said call detail records generated by said standard call processing process.

31. A method for programmable call processing for a telecommunication switching system, comprising the steps of:
providing at least one customized call logic program extending subscriber services provided by a standard call processing process;
initializing said standard call processing process;
upon the occurrence of a specified event, transferring control from said standard call processing process to said at least one customized call logic program;
formulating call detail records by said standard call processing process; and
allowing said customized call logic program to alter selected fields of said call detail records.

32. A method for programmable call processing in a telecommunication switching system, comprising the steps of:
providing at least one customized call logic program extending subscriber services provided by a standard call processing process;
setting a trigger in said standard call processing process for the existence of a specified condition;
initializing said standard call processing process;
detecting said trigger in response to the existence of the specified condition, interrupting said standard call processing process, and transferring control from said standard call processing process to said at least one customized call logic program;
providing a communication link between said at least one customized call logic program and said standard call processing process for passing information therebetween; and
allowing said customized call logic program to alter selected fields of call detail records formulated by said standard call processing process.

33. The method, as set forth in claim 32, further comprising the step of analyzing said trigger condition and consulting a trigger database for evaluation criteria and values.

34. The method, as set forth in claim 33, wherein said trigger data table consulting step includes the step of consulting a match value table having values used in said triggering condition evaluations.

35. The method, as set forth in claim 32, further comprising the step of allowing said at least one customized call logic program to access a call processing database.

36. The method, as set forth in claim 32, further comprising the steps of:
allowing said at least one customized call logic program to access a static call processing database having circuit configurations of said switching system; and
allowing said at least one customized call logic program to access a static call processing database having call data blocks.

37. The method, as set forth in claim 32, further comprising the steps of transferring back control from said at least one customized call logic program to said standard call processing process at said specified condition after the completion of customized call processing.

38. The method, as set forth in claim 32, further comprising the steps of transferring back control from said at least one customized call logic program to said standard call processing process at a specified point in call after the completion of customized call processing.

39. The method, as set forth in claim 32, further comprising the step of providing an application program interface between said standard call processing process and said at least one customized call logic program for passing control therebetween.

40. The method, as set forth in claim 32, further comprising the step of allowing said at least one customized call logic program to write a call data block to a static call processing database storing a plurality of call data blocks.

41. The method, as set forth in claim 32, further comprising the step of removing a trigger from said standard call processing process.

42. The method, as set forth in claim 32, further comprising the steps of embedding in said standard call processing process said at least one customized call logic program.

43. The method, as set forth in claim 32, further comprising the steps of:
  modeling said standard call processing process as a set of finite state machines; and
  modeling said customized call logic program as a sub-state machine embedded in said standard call processing process state machines.

44. The method, as set forth in claim 32, further comprising the steps of:
  modeling said standard call processing process as a set of finite state machines; and
  adding at least one sub-state machine to said standard call processing process state machines.

45. A method for programmable call processing in a telecommunication switching system, comprising the steps of:
  providing at least one customized call logic program extending subscriber services provided by a standard call processing process;
  setting a trigger in said standard call processing process for the existence of a specified condition;
  initializing said standard call processing process;
  detecting said trigger in response to the existence of the specified condition, interrupting said standard call processing process, and transferring control from said standard call processing process to said at least one customized call logic program;
  analyzing said trigger condition and consulting a trigger database for evaluation criteria and values, wherein said trigger condition analyzing step comprises the steps of:
    consulting a trigger rule item table having a plurality of trigger rule items for evaluating the triggering condition;
    consulting a criteria node table having data used to evaluate the triggering condition; and
    consulting a trigger data table having data used to assemble a message to said at least one customized call logic program for passing control thereto.

46. A method for programmable call processing in a telecommunication switching system, comprising the steps of:
  providing at least one customized call logic program extending subscriber services provided by a standard call processing process;
  setting a trigger in said standard call processing process for the existence of a specified condition;
  initializing said standard call processing process;
  detecting said trigger in response to the existence of the specified condition, interrupting said standard call processing process, and transferring control from said standard call processing process to said at least one customized call logic program;
  analyzing said trigger condition and consulting a trigger database for evaluation criteria and values, wherein said trigger condition analyzing step comprises the steps of:
    consulting a trigger rule item point list indexable by a point in call at which a triggering condition existed; and
    consulting a trigger rule item decision tree having at least one node referenced by said trigger rule item point list, each node having triggering criteria and trigger data stored therein for passing control to said at least one customized call logic program.

47. A method for programmable call processing in a telecommunication switching system, comprising the steps of:
  providing at least one customized call logic program extending subscriber services provided by a standard call processing process;
  setting a trigger in said standard call processing process for the existence of a specified condition;
  initializing said standard call processing process;
  detecting said trigger in response to the existence of the specified condition, interrupting said standard call processing process, and transferring control from said standard call processing process to said at least one customized call logic program;
  generating call detail records by said standard call processing process; and
  allowing said customized call logic program to formulate call detail records to replace said call detail records generated by said standard call processing process.

48. A method for programmable call processing in a telecommunication switching system, comprising the steps of:
  providing at least one customized call logic program extending subscriber services provided by a standard call processing process;
  setting a trigger in said standard call processing process for the existence of a specified condition;
  initializing said standard call processing process;
  detecting said trigger in response to the existence of the specified condition, interrupting said standard call processing process, and transferring control from said standard call processing process to said at least one customized call logic program;
  formulating call detail records by said standard call processing process; and
  allowing said customized call logic program to alter selected fields of said call detail records.

* * * * *

UNITED STATES PATENT AND TRADEMARK OFFICE
CERTIFICATE OF CORRECTION

PATENT NO. : 5,940,487
DATED : August 17, 1999
INVENTOR(S) : Bunch et al.

It is certified that error appears in the above-identified patent and that said Letters Patent is hereby corrected as shown below:

Title page, [60], after "provisional application No." delete "08/015,237" and insert --60/015,237--.

Signed and Sealed this

Ninth Day of May, 2000

Attest:

Q. TODD DICKINSON

*Attesting Officer*   *Director of Patents and Trademarks*